United States Patent
Kurane et al.

(10) Patent No.: US 8,836,828 B2
(45) Date of Patent: Sep. 16, 2014

(54) IMAGING DEVICE AND IMAGING CONTROL CIRCUIT

(75) Inventors: Haruhisa Kurane, Shiojiri (JP); Takashi Shindo, Chino (JP)

(73) Assignee: Seiko Epson Corporation, Tokyo (JP)

( * ) Notice: Subject to any disclaimer, the term of this patent is extended or adjusted under 35 U.S.C. 154(b) by 543 days.

(21) Appl. No.: 13/157,841

(22) Filed: Jun. 10, 2011

(65) Prior Publication Data

US 2011/0317049 A1 Dec. 29, 2011

(30) Foreign Application Priority Data

Jun. 23, 2010 (JP) .................................. 2010-142919

(51) Int. Cl.
*H04N 3/14* (2006.01)
*H04N 5/232* (2006.01)
*H04N 5/225* (2006.01)

(52) U.S. Cl.
CPC ................................ *H04N 5/23203* (2013.01)
USPC ....................................... 348/294; 348/207.1

(58) Field of Classification Search
USPC .................................. 348/294, 207.1–207.11
See application file for complete search history.

(56) References Cited

U.S. PATENT DOCUMENTS

| | | | | |
|---|---|---|---|---|
| 6,144,806 A * | 11/2000 | Seki et al. | ...................... | 396/208 |
| 6,963,368 B1 * | 11/2005 | Shibazaki | ...................... | 348/241 |
| 8,013,902 B2 * | 9/2011 | Ozaki | ........................ | 348/222.1 |
| 2006/0139460 A1 * | 6/2006 | Ozaki | ........................ | 348/222.1 |
| 2007/0127052 A1 * | 6/2007 | Cheng | ......................... | 358/1.14 |
| 2010/0039530 A1 * | 2/2010 | Guo et al. | ................ | 348/231.99 |
| 2011/0016338 A1 * | 1/2011 | Williamson et al. | .......... | 713/323 |

FOREIGN PATENT DOCUMENTS

JP  A-2009-111546  5/2009

* cited by examiner

*Primary Examiner* — Sinh Tran
*Assistant Examiner* — Christopher K Peterson
(74) *Attorney, Agent, or Firm* — Oliff PLC

(57) ABSTRACT

An imaging device 1 is configured to include an imaging element 10 and a DSP 20. The imaging element 10 includes a sensor register 13 that stores imaging control information, and the DSP 20 includes a mirror register 25 having a configuration equivalent to that of the sensor register 13. A system controller 23 controls such that identical imaging control information is stored in the sensor register 13 and the mirror register 25, and a timer section 29 is configured such that, in response to timer events generated with a period of a time interval T1, the imaging control information stored in the mirror register 25 is transmitted to the imaging element 10, thereby refreshing the sensor register 13.

12 Claims, 11 Drawing Sheets

| Register address | Function |
|---|---|
| 000h | Command |
| 001h | Timer period |
| 002h | ... |
| ... | ... |
| 010h | Mirror register 0 |
| 011h | Mirror register 1 |
| 012h | Mirror register 2 |
| 013h | Mirror register 3 |
| 014h | ... |
| ... | ... |

| EEPROM ADDRESS | REGISTER ADDRESS (EVEN) | REGISTER DATA (ODD) | OPERATION |
|---|---|---|---|
| 000h | 01h | XXh | WRITE TO DSP REGISTER |
| 002h | 02h | XXh | WRITE TO DSP REGISTER |
| 004h | 03h | XXh | WRITE TO DSP REGISTER |
| 006h | 10h | XXh | WRITE TO MIRROR REGISTER 0 |
| 008h | 11h | XXh | WRITE TO MIRROR REGISTER 1 |
| 00Ah | 12h | XXh | WRITE TO MIRROR REGISTER 2 |
| ... | ... | ... | |
| ... | ... | ... | |
| ... | 00h | 55h | IMAGING START COMMAND |

FIG. 5

IMAGING DEVICE AND IMAGING CONTROL CIRCUIT

The entire disclosure of Japanese Patent Application No. 2010-142919, filed on Jun. 23, 2010 is expressly incorporated by reference herein

BACKGROUND

1. Technical Field

The present invention relates to an imaging device and, in particular, to technology that reduces occurrences of malfunctions due to damage to data relating to operation control of imaging devices in inferior surroundings.

2. Related Art

Recently, machine vision (sensing) that uses imaging devices (e.g., cameras) have been put in practical use. For example, a camera is mounted on a mobile object such as an automobile, and a variety of controls of the mobile object are performed using image data captured by the camera. When a camera is mounted on a mobile object such as an automobile, it is highly likely that the camera is operated in inferior surroundings in which external noise such as static electricity, thunderbolt and the like are present. Also, the camera may not always be operated under stable conditions, because it is battery-driven and therefore the power supply condition would likely become unstable due to fluctuation in the power supply and noise.

In particular, an automobile is equipped with many sources that generate strong electromagnetic waves, such as, generators, electrical components for the ignition system and the like. Influence of electromagnetic waves could lead to malfunctions. In order to prevent such malfunctions, electronic devices are surrounded by electromagnetic shields to prevent mixing of such electromagnetic waves.

A typical composition of a camera is shown in FIG. 12. The camera shown as an example in FIG. 12 is configured with a microcomputer that governs the overall operation of the camera, a ROM (a nonvolatile memory) that stores a program for the microcomputer, an imaging lens, an imaging element, a digital signal processor (DSP) that processes captured image signals from the imaging element and outputs image signals for display to a host system, and a power supply circuit that converts a power supply from a battery device to a power supply voltage for each device.

A serial communication signal in FIG. 12 normally controls electronic shutter speeds of the imaging element. The host system may be, for example, a navigation system, an ECU or the like mounted on an automobile. Image signals for display may be transmitted to the host system, for example, as analog video signals, video signals of digital differential pairs, or optical video signals. It is noted that the imaging element in the camera needs to take in external light, and therefore cannot be covered by an electromagnetic shield that shuts off electromagnetic wave which is external noise. Therefore, the imaging device would likely be affected by external noise. Also, it is likely that power supply noise generated by the battery device cannot be completely removed by the power supply circuit within the imaging device.

More specifically, when a CMOS image sensor that can switch its operation with registers is used for the vehicle-mounted camera, the register values may suddenly change due to the aforementioned noise, which would possibly cause an abnormal state (a hang up), and an operational abnormality. Such an operational abnormality could lead to a very dangerous situation, when the driver is performing a driving operation while watching the captured image, or the host system shown in FIG. 12 is controlling the vehicle using the captured image. Furthermore, not only the imaging element, but also the microcomputer of the camera may malfunction. When the microcomputer has a malfunction, the entire system would be placed in an abnormal state. In this connection, for example, JP-A-2009-111546 describes an imaging device as a technology to prevent malfunctions of a camera.

The technology described in JP-A-2009-111546 may prevent malfunctions of a camera for a local failure, but may find it difficult to prevent or reduce malfunctions which may be caused by damage to control information stored in the registers of the camera due to electromagnetic waves, noise and the like.

SUMMARY

In accordance with an advantage of some aspects of the invention, it is possible to provide an imaging device and an imaging control circuit that are suitable in reducing the occurrence of malfunctions of an imaging element which may be caused by external noise, fluctuation of the power supply and the like.

In accordance with Aspect 1 of the invention, an imaging device is equipped with an imaging element that is capable of imaging an imaging object and an imaging control circuit that controls an imaging operation of the imaging element. The imaging element includes a first register; an imaging control information reception device that receives imaging control information for controlling the imaging operation of the imaging element; a first imaging control information storage device that stores the imaging control information received by the imaging control information reception device in the first register; and an imaging device that performs an imaging operation based on the imaging control information stored in the first register. The imaging control circuit includes a second register; a second imaging control information storage device that stores, in the second register, imaging control information that is the same as the imaging control information stored in the first register; an imaging control information transmission device that transmits the imaging control information stored in the second register to the imaging device; and a first imaging control information update device that transmits the imaging control information stored in the second register by the imaging control information transmission device to the imaging element upon establishment of a first predetermined condition during an imaging operation of the imaging element, and rewrites the imaging control information stored in the first register with the transmitted imaging control information.

According to the structure described above, identical imaging control information can be stored in the first register of the imaging element and in the second register of the imaging control circuit. Further, during the imaging operation, the imaging control information stored in the second register can be transmitted to the imaging element, and the imaging control information stored in the first register can be rewritten with the transmitted imaging control information, in response to establishment of the first predetermined condition. In other words, the first register and the second register has, for example, a so-called mirroring relationship in the RAID (Redundant Arrays of Inexpensive (or Independent) Disks) technology.

Therefore, when the imaging control information stored in the first register is damaged in an inferior environment where such information would highly likely be damaged by electromagnetic waves or the like, the imaging control information stored in the first register can be restored before the imaging operation is carried out in a state in which the imaging control information is damaged, depending on the setting of the first predetermined condition. Even when the imaging element is placed in an abnormal operational state by the damaged imaging control information, the imaging control information stored in the first register can be restored by using the detection of the abnormality as the establishment of the first predetermined condition.

In accordance with Aspect 2, in the imaging device of Aspect 1, the imaging control circuit may be equipped with a first time period detection device that periodically detects the passage of a first predetermined time, and the first predetermined condition may be established each time the first time period detection device detects the passage of the first predetermined time. In accordance with the second aspect, the imaging control information stored in the first register can be rewritten with the same information as the imaging control information stored in the second register with the period of the first predetermined time. Therefore, as the imaging control information of the first register can be periodically rewritten (refreshed), it is possible to reduce imaging operations that may be carried out in a state in which the imaging control information stored in the first register is damaged.

In accordance with Aspect 3, in the imaging device of Aspect 2, the imaging element may output captured image data obtained through imaging an imaging object by the imaging operation as a captured image signal including an effective data output period and an invalid data output period. The first imaging control information update device may transmit, in response to establishment of the first predetermined condition, the imaging control information stored in the second register by the imaging control information transmission device to the imaging element during the invalid data output period of the captured image signal that is outputted by the imaging element.

According to the structure described above, during the period when input and output (IO) of signals for each of digital circuits in the imaging element are hardly performed, transmission of the imaging control information and rewriting of the imaging control information of the first register can be performed. Therefore, the imaging control information can be transmitted during the period when no or almost no fluctuation in the power supply occurs, such that stable communications can be performed, and S/N deterioration of signals can be suppressed.

In accordance with Aspect 4, in the imaging device of any one of Aspect 1 through Aspect 3, the imaging control circuit may be equipped with an element abnormality detection device that detects occurrence of an abnormality in the imaging element based on a signal outputted from the imaging element, and the first predetermined condition may be established in response to detection of an abnormality by the element abnormality detection device. According to such a structure, when an imaging operation is carried out in a state in which the imaging control information stored in the first register is damaged, the abnormality can be detected and the imaging control information of the first register can be rewritten with the same information as the imaging control information stored in the second register. Therefore, even when the imaging element has an abnormal operation, such abnormal operation can be detected and its normal operation can be restored.

In accordance with Aspect 5, in the imaging device of Aspect 4, the imaging control circuit may be equipped with a first initialization signal transmission device that transmits, in response to detection of an abnormality by the element abnormality detection device, an initialization signal for initializing each of the digital circuits composing the imaging element; and the first imaging control information update device may transmit the imaging control information stored in the second register by the imaging control information transmission device to the imaging element, after the initialization.

According to the structure described above, when an abnormality occurs in the imaging element, an initialization signal for initializing each of the digital circuits such as registers, sequencers, counters and the like composing the imaging element can be transmitted to the imaging element. Then, after the initialization, the imaging control information of the first register can be rewritten with the same information as the imaging control information stored in the second register. Therefore, the normal operation can be more reliably restored from malfunction caused by damage to the imaging control information stored in the first register, and can also be restored from other abnormality that is not caused by damage to the imaging control information.

In accordance with Aspect 6, the imaging device of any one of Aspect 1 through Aspect 5 may be further equipped with a nonvolatile memory that stores the imaging control information, and the imaging control circuit may be equipped with a second imaging control information update device that performs, in response to establishment of a second predetermined condition, a first update processing of reading, from the nonvolatile memory, imaging control information identical with the imaging control information stored in the first register and rewriting the imaging control information stored in the second register with the imaging control information readout.

Therefore, when the imaging control information stored in the second register is damaged in an inferior environment where such information would highly likely be damaged, the imaging control information stored in the second register can be restored before it is sent in the damaged state to the imaging element, depending on the setting of the second predetermined condition. Even when the imaging control circuit is placed in an abnormal operational state by external noise, such as, thunderbolt, static electricity, electromagnetic waves and the like, the imaging control information stored in the second register can be restored by using the detection of the abnormality as the establishment of the second predetermined condition.

In accordance with Aspect 7, in the imaging device of Aspect 6, the first imaging control information update device may transmit, after completion of the first update processing, the written imaging control information to the imaging element, using the imaging control information transmission device. According to this structure, even after the damaged imaging control information has been stored in the first register, normal imaging control information can be re-transmitted and re-stored. Accordingly, the normal imaging control information can be restored earlier before detection of an abnormality in the imaging element. Further, when the imaging element has an abnormal operation that is not (or cannot be) detected as being abnormal due to damage to the imaging control information, it can be restored to the normal operation.

In accordance with Aspect 8, in the imaging device of Aspect 6 or Aspect 7, the nonvolatile memory may store, in addition to the imaging control information, operation control information for controlling the operation of each of the components of the imaging control circuit; the imaging control circuit may be equipped with a third register that stores the operation control information, an operation control information storage device that reads the operation control information from the nonvolatile memory and stores the readout operation control information in the third register, and an operation control information update device that performs, during an imaging operation of the imaging element, in response to establishment of a second predetermined condition, a second update processing of reading out the operation control information from the nonvolatile memory, and rewriting the operation control information stored in the third register with the operation control information readout; and the second imaging control information update device may perform the first update processing after completion of the second update processing.

According to the structure described above, even in an environment in which the operation control information stored in the third register may be damaged by any factor, the operation control information stored in the third register can be restored to the normal operation control information, depending on the setting of the second predetermined condition, before the imaging control circuit operates with the damaged operation control information. Also, when the imaging control circuit has an abnormal operation state, the imaging control information stored in the third register can be restored, through using the detection of the abnormality as the establishment of the second predetermined condition. Then, after restoring the operation control information stored in the third register, the imaging control information stored in the second register is rewritten, such that the imaging control information can be more reliably rewritten to the normal imaging control information.

In accordance with Aspect 9, in the imaging device of any one of Aspect 6 through Aspect 8, the imaging control circuit may be equipped with a second time period detection device that periodically detects the passage of a second predetermined time, and the second predetermined condition may be established each time the second time period detection device detects the passage of the second predetermined time. According to this structure, the imaging control information stored in the second register can be rewritten with the normal imaging control information stored in the nonvolatile memory with the period of the second predetermined time. Therefore, as the imaging control information of the second register can be periodically rewritten (refreshed), it is possible to reduce the occurrence of transmission of the damaged imaging control information to the imaging element. Further, the operation control information of the third register can be rewritten with the normal operation control information stored in the nonvolatile memory with the period of the second predetermined time. Accordingly, the operation control information of the third register can be periodically rewritten (refreshed), such that it is possible to reduce incidents in which the imaging control circuit operates with damaged operation control information.

In accordance with Aspect 10, in the imaging device of Aspect 8 or Aspect 9, the imaging control circuit may be equipped with a circuit abnormality detection device that detects occurrence of an abnormality in the imaging control circuit, and the second predetermined condition may be established in response to detection of an abnormality by the circuit abnormality detection device. According to this structure, when the operation is performed with the operation control information stored in the third register in a damaged state, its abnormality can be detected, and the imaging control information of the third register can be rewritten with the normal operation control information stored in the nonvolatile memory. Therefore, when the imaging control circuit has an abnormal operation, its abnormality can be detected and the normal operation can be restored.

In accordance with Aspect 11, in the imaging device of Aspect 10, the imaging control circuit may be equipped with an initialization device that initializes each of the components composing the imaging control circuit in response to detection of an abnormality in the imaging control circuit by the circuit abnormality detection device, and the operation control information update device may perform the second update processing after the initialization by the initialization device. According to this structure, when an abnormality occurs in the imaging control circuit, each of the components such as registers, sequencers, counters and the like composing the imaging control circuit can be initialized. Then, after the initialization, the second update processing can be conducted. The normal operation can be more reliably restored from malfunction that may be caused by damage to the control information stored in each of the registers, and can also be restored from other abnormality that is not caused by damage to the control information.

In accordance with Aspect 12, in the imaging device of any one of Aspect 8 through Aspect 11, the imaging control circuit may be equipped with a second initialization signal transmission device that transmits an initialization signal for initializing each of the components of the imaging device to the imaging element, after completion of the first update processing and the second update processing, and the first imaging control information update device may transmit the rewritten imaging control information stored in the second register by the imaging control information transmission device to the imaging element, after the imaging element has been initialized by the initialization signal.

According to this structure, after completion of the first update processing and the second update processing, an initialization signal for initializing each of the digital circuits composing the imaging device can be transmitted to the imaging element. Then, after initialization, the imaging control information of the first register can be rewritten with the same information as the imaging control information stored in the second register. Therefore, when the imaging element has a malfunction due to an operation failure of the imaging control circuit, the imaging element can be more reliably restored to its normal state.

In accordance with Aspect 13, the imaging device in any one of Aspect 1 through Aspect 12 may be equipped with an electromagnetic shield device that shields the imaging control circuit from external electromagnetic interference. According to this structure, the imaging control circuit can be protected from external noise such as thunderbolt, static electricity, electromagnetic waves and the like, such that the probability of the control information stored in the second register and the third register being damaged by external noise can be reduced. Therefore, each of the refresh functions can be more effectively carried out.

In accordance with Aspect 14, there is provided an imaging control circuit for controlling an imaging operation of an imaging element that has a first register, receives imaging control information for controlling the imaging operation, stores the imaging control information received in the first register, and controls the imaging operation based on the imaging control information stored. The imaging control circuit includes a second register; a imaging control information storage device that stores, in the second register, imaging control information that is the same as the imaging control information stored in the first register; an imaging control information transmission device that transmits the imaging control information stored in the second register to the imaging device; and an imaging control information update device that transmits the imaging control information stored in the second register to the imaging element in response to establishment of a first predetermined condition during an imaging operation of the imaging element, and rewrites the imaging control information stored in the first register with the transmitted imaging control information. According to this structure, the action and effect equivalent to those achieved by the imaging device of the first aspect of the embodiment can be obtained.

BRIEF DESCRIPTION OF THE DRAWINGS

FIG. 5 is a table showing an example of the data structure of data stored in a ROM 50.

DESCRIPTION OF EXEMPLARY EMBODIMENTS

An embodiment of the invention will be described below with reference to the accompanying drawings. FIGS. 1-11 show an imaging device and an imaging control circuit in accordance with embodiments of the invention.

Structure of Imaging Device

Figure 1:
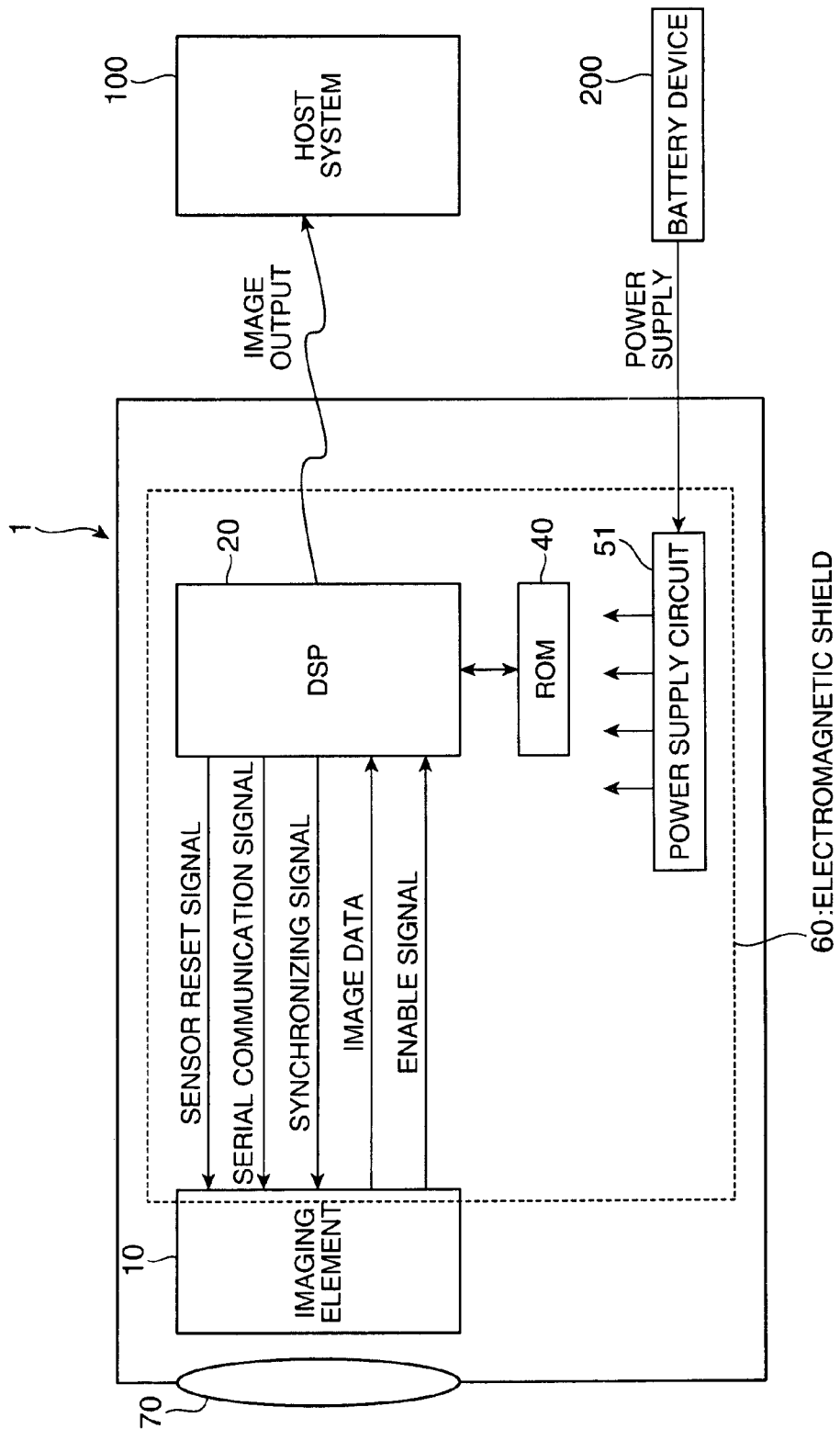
FIG. 1 is a schematic block diagram of the configuration of an imaging device 1 in accordance with an embodiment of the invention.

First, the structure of an imaging device in accordance with an embodiment of the invention will be described with reference to FIG. 1. FIG. 1 is a schematic block diagram of the configuration of an imaging device 1 in accordance with an embodiment of the invention. The imaging device 1 is configured with an imaging element 10, a DSP 20, a ROM 40, a power supply circuit 51, an electromagnetic shield 60, and an imaging lens 70. The imaging device 10 is equipped with a CMOS type image sensor, and is capable of controlling imaging operations, such as, changing the drive mode and the like with control information that may be stored in its internal sensor register by an external program.

The DSP 20 controls the imaging operation of the imaging element 10 through setting register values (storing control information) at the sensor register, supplying synchronizing signals and the like. The DSP 20 performs periodical refreshing operations for the sensor register of the imaging element 10 and its own internal register. The DSP 20 also detects abnormality in the imaging element 10 and the DSP 20 itself, and performs fail-safe operation such as initialization of the imaging element 10 and the DSP 20 itself, resetting of each of the registers, and the like, at the time of detection of abnormality. Further, the DSP 20 receives a captured image signal obtained through imaging an imaging object by the imaging element 10, generates an image signal for display based on the received captured image signal, and outputs the image signal to an external host system 100.

The ROM 40 is a nonvolatile memory, and stores control information to be set at each of the registers of the imaging element 10 and the DSP 20, and operation control commands for controlling the operation of the DSP 20. The power supply circuit 51 converts a power supply voltage provided from an external battery device 200 to a voltage for driving each of the components of the imaging device 1, and supplies the voltage to each of the components. The power supply circuit 51 converts a power supply voltage supplied from an external battery device 200 to a voltage for driving each of the components of the imaging device 1 and supply the voltage to each of the components. The electromagnetic shield 60 has the function to shield each of the components in the imaging device 1 other than the imaging element 10 from external electromagnetic interference.

More specifically, the electromagnetic shield 60 is made of a metal plate, a metal mesh or the like and configured to cover portions of the imaging device 1 other than those of the components relating to sensing operation such as the imaging element 100 and the imaging lens 70. When a metal mesh is used, openings forming the mesh must be substantially smaller than the wavelength of the electromagnetic wave that may enter the imaging device 1. The imaging lens 70 collects light from an imaging object, and outputs the collected light through a micro-lens (not shown) to each sensor cell of the sensor section of the imaging element 10.

The host system 100 receives image data for display from the DSP 20 and displays the image data on a monitor (not shown), performs drive assist and the like. Also, according to the embodiment, the host system 100 outputs a system reset signal to the DSP 20 to reset (turn ON/OFF) the DSP 20. The battery device 200 may be composed of a nickel hydrogen battery, a lithium ion battery or the like, and supplies its stored electrical power through an inverter to each vehicle-mounted electric device including the imaging device 1 and the host system 100. Also, the battery device 200 may be charged through the inverter with an electrical power generated by a vehicle-mounted generator.

Figure 2:
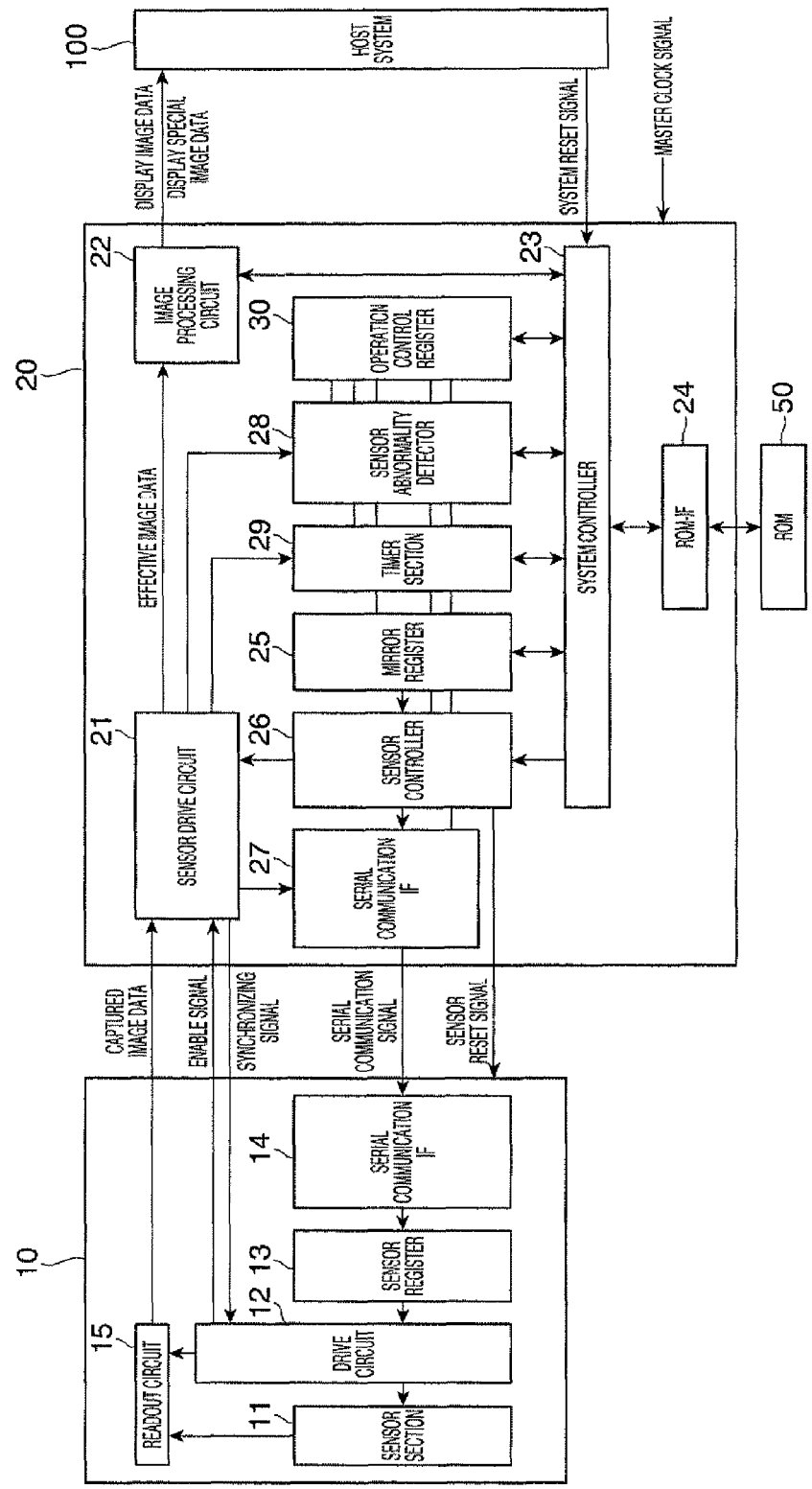
FIG. 2 is a detailed block diagram of the configuration of the imaging device 1.

Next, referring to FIG. 2, the configuration of the imaging device 1 will be described in detail. FIG. 2 is a block diagram showing the configuration in detail of the imaging device 1.

Configuration of Imaging Element 10

As shown in FIG. 2, the imaging element 10 includes a sensor section 11, a drive circuit 12, a sensor register 13, a serial communication interface (IF) 14, and a readout circuit 15. The sensor section 11 is equipped with a photo receiving region configured with photo receiving elements (photodiodes or the like) and plural sensor cells (pixels) including amplifiers arranged in a two-dimensional matrix, which are manufactured using the CMOS technology, converts light received at each of the photo receiving elements at respective pixels to an electrical signal, and outputs the same.

More specifically, the sensor section 11 has a configuration in which address lines, reset lines and readout lines are commonly connected with lines of the pixels, respectively. Various kinds of driving signals are transmitted to the sensor cells composing each of the lines through the address lines, the reset lines and the readout lines, and accumulated charges (pixel signals) are outputted to the readout circuit 15 through the signal lines when selected ones of the address lines and readout lines become effective. The driving circuit 12 drives the sensor section 11 and the readout circuit 15, based on a drive mode set by the sensor register 13 and a synchronization signal from the DSP 20. Also, the drive circuit 12 outputs a data enable signal in synchronism with the output timing of captured image data.

The sensor register 13 stores imaging control information received from the DSP 20 through the serial communication IF 14 in storage regions at corresponding respective addresses. Also, the sensor register 13 sets the drive circuit 12 to a predetermined drive mode according to the value of the imaging control information stored in the sensor register 13. The serial communication IF 14 receives imaging control information for setting the imaging mode and the like and write commands for the imaging control information that are transmitted from the DSP 20 as serial communication signals. More specifically, the serial communication IF 14 receives a register write command and imaging control information from the DSP 20, and stores the received imaging control information, according to the received write command, in the storage regions at addresses of the sensor register 13 designated by the command. The readout circuit 15 reads the captured image signal from the sensor section 11, renders various kinds of signal processing including A/D conversion to the captured (analog) image signal readout, and outputs the same to the DSP 20 as digital captured image data. The readout circuit 15 outputs the captured image data in synchronism with the synchronization signal from the DSP 20.

Configuration of DSP 20

As shown in FIG. 2, the DSP 20 is configured with a sensor drive circuit 21, an image processing circuit 22, a system controller 23, a ROM-IF 24, a mirror register 25, a sensor controller 26, a serial communication IF 27, a sensor abnormality detector 28, a timer section 29, and an operation control register 30.

The sensor drive circuit 21 outputs a synchronization signal for driving the drive circuit 12 to the imaging element 10. The synchronization signal includes a horizontal synchronization signal, a vertical synchronization signal, a drive clock and the like. Also, the sensor drive circuit 21 captures the captured image data outputted from the readout circuit 15 of the imaging element 10 according to the data enable signal outputted from the drive circuit 12, and outputs the captured image data captured as effective data to the image processing circuit 22.

Further, the sensor drive circuit 21 transmits a data enable signal and the effective captured image data (hereafter referred to as the effective image data) to the sensor abnormality detector 28. Also, the sensor drive circuit 21 transmits the synchronization signal that is free-running to the timer section 29. The image processing circuit 22 renders image processing such as color correction processing, gamma conversion processing and the like to the effective image data sent from the sensor drive circuit 21, thereby generating image data for display, and outputs the generated display image data to the host system 100.

Also, when a sensor failure event (to be described below) occurs, the image processing circuit 22 outputs display special image data for displaying a special image prepared in advance, instead of the display image data, to the host system 100. The system controller 23 has the function to comprehensively control each of the constituting components (hereafter referred to as circuit modules) of the DSP 20. More specifically, first, the system controller 23 receives a write request for writing to the operation control register 30 corresponding to each of the circuit modules and control information (operation control information) to be stored from the ROM-IF 24, and writes the received operation control information in the operation control register 30 in response to the request.

Second, the system controller 23 receives, from the ROM-IF 24, a write request for writing to the mirror register 25 and control information (imaging control information) to be stored, and writes in response thereto the imaging control information to the mirror register 25. Third, the system controller 23 transmits a command to each of the circuit modules. Fourth, the system controller 23 receives requests from the timer section 29 and the sensor abnormality detector 28, interprets the requests, and transmits commands to corresponding ones of the circuit modules. Fifth, the system controller 23 transmits a reset signal for a watchdog timer (to be described below) to the timer section 29.

In the fourth aspect described above, the requests from the timer section 29 and the sensor abnormality detector 28 are notified to the system controller 23 as a timer event 1 signal, a timer event 2 signal, a sensor abnormality event signal, and a DSP abnormality event signal. Upon receiving the timer event 1 signal, the system controller 23 transmits a command to the sensor controller 26, and executes a refreshing operation of the sensor register 13.

Upon receiving the timer event 2 signal, the system controller 23 transmits a command to the ROM-IF 24, and executes a refreshing operation of the mirror register 25 and the operation control register 30. Upon receiving the sensor abnormality event signal, the system controller 23 transmits a command to the sensor controller 26, and executes a sensor reset operation to reset the imaging element 10, and a refreshing operation of the sensor register 13.

Upon receiving the DSP abnormality event signal, the system controller 23 executes a system reset operation to reset the entire DSP 20 including the mirror register 25 and the control register. After resetting, the system controller 23 executes a refreshing operation to refresh the mirror register 25 and the operation control register 30 in response to a command from the ROM-IF 24. Then, the system controller 23 executes a refreshing operation of the sensor reset operation and the sensor register 13.

It is noted that the system reset operation and the transmission of the reset signal to the watchdog timer may be conducted upon transmission of a system reset signal from the host system 100. The ROM-IF 24 has the function to access to an external ROM 50 and to retrieve operation control information to be stored (set) to the operation control register 30, imaging control information to be stored in the mirror register 25, and commands to control the operation of each of the circuit modules of the DSP 20.

Also, the ROM-IF 24 transmits various kinds of the retrieved control information and commands to the system controller 23. As the commands, an imaging operation control command and the like may be enumerated. The mirror register 25 has a register structure equivalent to that of the sensor register 13 of the imaging element 10, and stores the same information as the imaging control information to be stored in the sensor register 13 (i.e., mirroring). The imaging control information may be stored in the mirror register 25 through the system controller 23. As described above, imaging control information to be stored in the mirror register 25 is transmitted from the ROM-IF 24 to the system controller 23. The sensor controller 26 reads the imaging control information set as register values from the mirror register 25, based on a command from the system controller 23, and instructs the serial communication IF 27 to transmit the readout imaging control information to the imaging element 10.

Also, the sensor controller 26 outputs a sensor reset signal to the imaging element 10 based on a command from the system controller 23. When the sensor reset signal becomes effective, the sensor register 13 within the imaging element 10 is initialized, and the digital circuits such as the internal sequencer, the counter and the like are set to a reset state (an initial state). Then, when the sensor reset signal is released, the imaging element 10 is set to an operational state.

The sensor controller 26 operates the sensor drive circuit 21, based on a command from the system controller 23. The serial communication IF 27 has the function of parallel-to-serial converting the imaging control information readout from the mirror register 25 and a register write command, based on a communication start command from the sensor controller 26, and the function of transmitting them through serial communications to the imaging element 10.

The serial communication IF 27 is configured to perform serial communications during blanking periods of the captured image data signal, in serial communications at the time of a failsafe operation to be described below, based on a synchronizing signal from the sensor drive circuit 21. For example, serial communication is performed when the captured image data is in horizontal blanking periods or vertical blanking periods. The sensor abnormality detector 28 has the function to judge, based on a data enable signal and the captured image data signal from the sensor drive circuit 21, as to whether or not the operation of the imaging element 10 is abnormal. For example, when the data enable signal is invalid for a period longer than a predetermined period, the sensor abnormality detector 28 judges that an abnormality is occurring in the imaging element 10, and transmits a sensor abnormality event signal to the system controller 23. The judgment as to whether or not the data enable signal is invalid can be made, for example, when the effective image data is not received for a period for five frames when the data enable signal is active.

The timer section 29 has the function to receive a free-running synchronizing signal from the sensor drive circuit 21, measure (count) the synchronizing signal, and generate various kinds of timer events periodically (at a specified time interval). In other words, the timer section 29 transmits timer event signals to the system controller 23 when the specified period has passed. In accordance with an aspect of the embodiment, the timer event 1 is generated each time a first period of time T1 passes, and the timer event 2 is generated each time a second period of time T2 (T1<<T2) passes. It is noted that the count value for T1 is CT1, and the count value for T2 is CT2.

Also, the timer section 29 has the function as a watchdog timer that down-counts a count value CW that is pre-set based on the master clock signal, to detect the presence or absence of an abnormality in the DSP 20. More specifically, the timer section 29 down-counts the pre-set count value CW, and generates a DSP abnormality event when it judges that an abnormality is occurring in the DSP 20 when the timer is not reset before its count value becomes "0."

It is noted that the aforementioned CT1, CT2 and CW may be set at the registers within the timer section 29. In this case, writing to the registers may be performed from the system controller 23. The operation control register 30 is a register that stores operation control information that controls the operation of each of the circuit modules within the DSP 20. The operation control register 30 is communicatively connected with each of the circuit modules. Also, the operation control information may be stored in the operation control register 30 from the system controller 23. Further, the imaging element 10 and the DSP 20 are connected to each other by signal lines for transmission and reception of the sensor reset signal, the serial communication signal, the synchronizing signal, the captured image data signal, and the data enable signal.

Exemplary Configuration of Timer Section 29

Figures 3, 4:
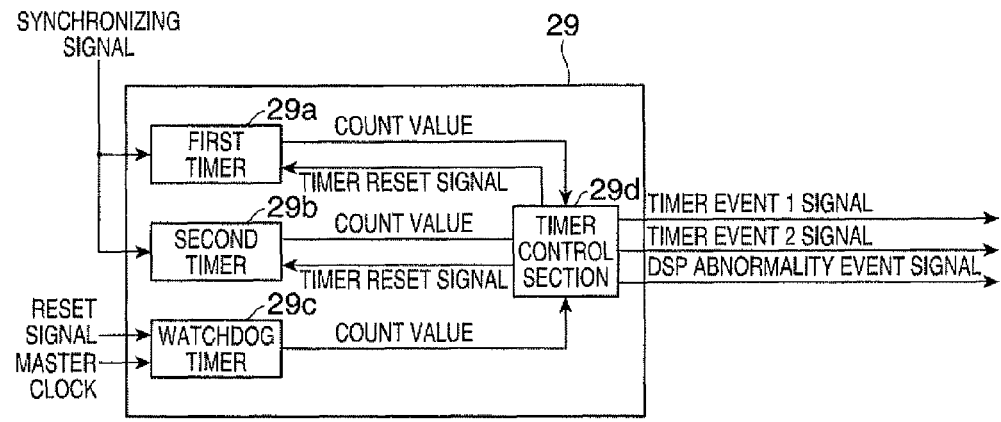
FIG. 3 is a detailed block diagram of the configuration of a timer section 29.
FIG. 4 shows an example of a register map of a DSP 20.

Next, the configuration of the timer section 29 will be described in detail based on FIG. 3. FIG. 3 is a block diagram showing the configuration in detail of the timer section 29. The timer section 29 is configured with a first timer 29a, a second timer 29b, a watchdog timer 29c and a timer control section 29d. Each of the first timer 29a and the second timer 29b up-counts one of the free-running synchronizing signals (for example, the vertical synchronizing signal) from the sensor drive circuit 21, and outputs the counted value to the timer control section 29d.

The watchdog timer 29c down-counts the master clock signal (the main clock signal of the DSP 20) supplied from the host system 100 with respect to a pre-set count value CW, and outputs the counted value to the timer controller 29. It is noted that the master clock signal may be generated by an oscillator such as a quartz oscillator (not shown) of the imaging device 1, or may be supplied from the host system 100. When the count value of the first timer 29a becomes to be CT1, the timer control section 29 generates a timer event 1, and resets the first timer 29a. The timer event 1 signal generated is transmitted to the system controller 23.

Also, when the count value of the second timer 29b becomes to be CT2, the timer control section 29 generates a timer event 2, and resets the second timer 29b. The generated timer event 2 signal is transmitted to the system controller 23. Also, when the count value of the watchdog timer 29c becomes to be "0," the timer control section 29d generates a DSP abnormal event, and transmits the generated DSP abnormal event signal to the system controller 23. For example, the watchdog timer with an x-bit counter is operated with the master clock signal of y MHz, a DSP abnormal event is generated after $2^x/(y \times 10^6)$ seconds if the timer is not reset by the time when the count value becomes to be "0."

Codes Stored in ROM 50

Next, codes (commands) stored in the ROM 50 will be described. There are two kinds of codes that are stored in the ROM 50 in accordance with an aspect of the embodiment. One of them is a register write command for writing a predetermined value to the register within the DSP 20, and the other is a DSP operation control command for controlling the operation of the DSP 20. The present embodiment may be configured such that the DSP operation control command is issued when the writing operation to the command register occurs. In other words, when a specified value is written to the command register, the DSP 20 interprets such an event as an operation control command.

Configuration of Register of DSP 20

Next, the configuration of the register of the DSP 20 will be described with reference to FIG. 4. FIG. 4 shows an example of a register map of the DSP 20. The register map of the DSP 20 uses a register address "00h" as a command register, as shown in FIG. 4. Addresses other than the register address "00h" are used as registers within the DSP 20. In other words, other than the register address "00h," the mirror register 25 and the operation control register 30 are set therein. In accordance with an aspect of the embodiment, when data "55h" is written to the register address "00h," the system controller 23 is configured to interpret such an event as an imaging start command. Also, when data "00h" is written to the register address "00h," the system controller 23 is configured to interpret such an event as an imaging end command.

Structure of Data Stored in ROM 50

Next, the data structure of data stored in the ROM 50 will be described with reference to FIG. 5. FIG. 5 shows an example of the data structure of data stored in the ROM 50. FIG. 5 shows an example in which an EEPROM (Electrically Erasable Programmable ROM) is used as the ROM 50, but other types of ROM may be used without any particular limitation. In accordance with an aspect of the embodiment, the DSP 20 reads data of the ROM 50 sequentially from its address 0. Data corresponding to the address numbers of the register are continuously stored in sequence from the address 0. More specifically, even numbered addresses of the ROM 50 store register addresses, and odd numbered addresses store register data (operation control information, imaging control information, and commands). The register addresses and the register data are each accessed in pair in the register.

Also, in accordance with an aspect of the embodiment, the ROM 50 also stores program codes for operating each of the circuit modules within the DSP 20 according to a specified procedure. For example, the ROM 50 stores a program code that programs the procedure of issuing commands from the release of the system reset until the start of imaging. In addition, the ROM 50 stores a program code that programs the procedure of issuing commands at the time of a failsafe operation that is executed at the time of occurrence of an event, such as, the timer event 1, the timer event 2, the sensor abnormality event, and the DSP abnormality event.

Operation Procedure by Program Code

Operation Procedure up to Start of Imaging

Figure 6:
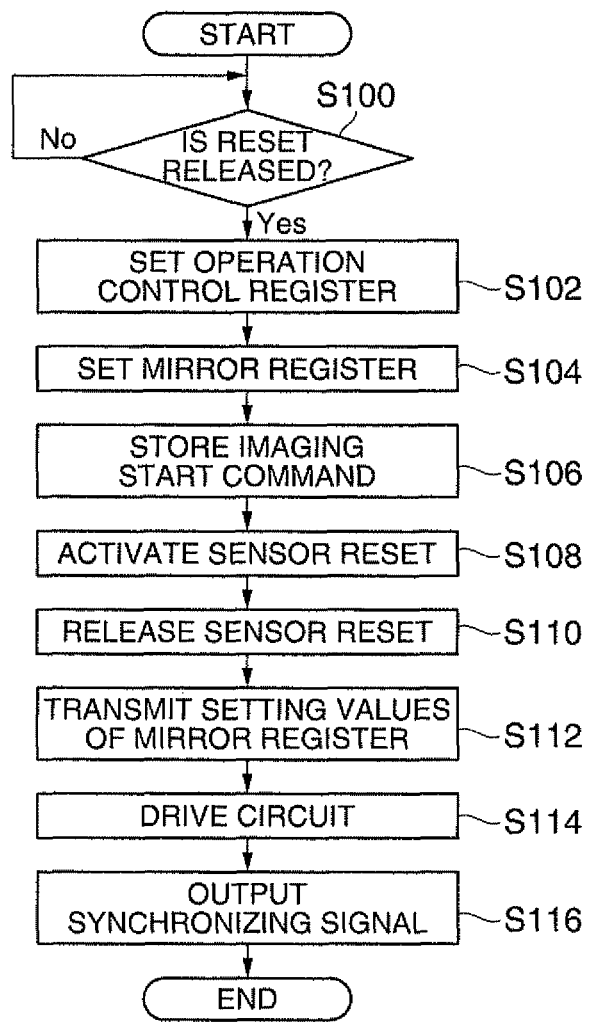
FIG. 6 is a flow chart showing an example of steps of an imaging start operation by each circuit modules.

Next, referring to FIG. 6, an imaging start operation that is performed, based on a program code stored in the ROM 50, after a reset release operation executed in the DSP 20 until an imaging start operation will be described. FIG. 6 is a flow chart showing an example of processing of the imaging start operation performed by each of the circuit modules. The imaging start operation is executed in the DSP 20 according to the program code stored in the ROM 50, and proceeds first to step S100 after the reset processing is done with a system reset signal sent from the host system 100, as shown in FIG. 6.

In step S100, when it is judged by the system controller 23 that the system reset signal supplied from the host system 100 is released (Yes), the processing proceeds to step S102. On the other hand, when it is not judged that the system reset signal is released (No), the processing waits until the reset is released. In this example, the step is configured to be operated with the release of a system reset from the host system 100 as a start, but may be configured to be operated with the release of a power-on reset that is generated when the power is turned on.

When the processing proceeds to step S102, the ROM-IF 24 reads out the operation control information from the ROM 50, and transmits, to the system controller 23, the operation control information readout and a write command to write to the operation control register 30. By this, the system controller 23 stores the operation control information in the operation control register 30, and the processing proceeds to step S104. In step S104, the ROM-IF 24 reads out the imaging control information from the ROM 50, and transmits, to the system controller 23, the imaging control information readout and a write command to write the same to the mirror register 25. By this, the system controller 23 stores the imaging control information received in the mirror register 25 according to the received write command, and the processing proceeds to step S106.

In step S106, the ROM-IF 24 stores the imaging start command "55h" in a command register corresponding to the register address "00h," and the processing proceeds to step S108. In step S108, upon receiving the imaging start command from the command register, the system controller 23 transmits the same to the sensor controller 26. Upon receiving the imaging start command, the sensor controller 26 makes effective (activates) the sensor reset signal, and the processing proceeds to step S110. By this, the sensor register inside the imaging element 10 is initialized according to the sensor reset signal, and the other internal digital circuits such as the sequencer and the counter are set to a reset state.

In step S110, after completion of the reset process of the imaging element 10, the sensor controller 26 releases the sensor reset signal, and the processing proceeds to step S112. In step S112, the system controller 23 transmits a communication start command, to the sensor controller 26, for serially transmitting the set values of the mirror register 25. By this, the sensor controller 26 reads out the imaging control information from the mirror register 25, and transmits the imaging control information readout and the communication start command to the serial communication IF 27. The serial communication IF 27 transmits, in response to the received communication start command, the received imaging control information and a register write command together through serial communications, to the imaging element 10, and the processing proceeds to step S114.

By this, the imaging element 10 receives, through the serial communication IF 14, the imaging control information and the register write command, and the imaging control information that is the same as that stored in the mirror register 25 is stored in the sensor register 13 according to the register write command. Then, by the imaging control information stored in the sensor register 13, the drive mode of the sensor section 11 is set.

In step S114, after transmitting the imaging control information, the sensor controller 26 transmits a command to the sensor drive circuit 21, thereby driving the sensor drive circuit 21. Further, the system controller 23 transmits a command to the image processing circuit 22, thereby driving the image processing circuit 22, and the processing proceeds to step S116. In step S116, the sensor drive circuit 21 generates a synchronizing signal, and outputs the generated synchronizing signal to the imaging element 10, which ends a series of the processing steps.

In this manner, when the synchronizing signal is transmitted to the imaging element 10, the drive circuit 12 is driven in the drive mode set in the sensor register 13 and the sensor section 11 is driven, thereby starting the imaging operation. Then, captured image data and a data enable signal are outputted through the read circuit 15 to the DSP 20. When the imaging operation is started at the imaging element 10, based on the data enable signal outputted from the imaging element 10, the image processing circuit 22 within the DSP 20 captures and receives effective image data, and renders image processing on the received effective image data to generate image data for display. Then, the generated display image data is outputted to the host system 100. In parallel with the processing described above, a failsafe operation to be described below is executed.

Register Refresh Operation

Figure 7:
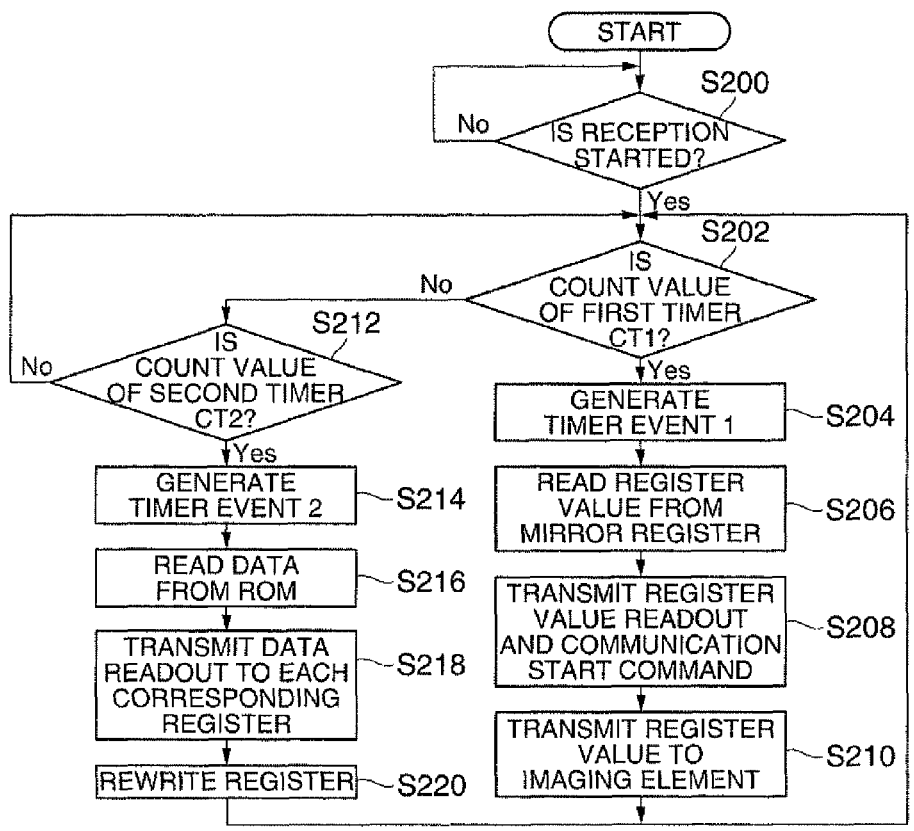
FIG. 7 is a flow chart showing an exemplary procedure of a register refreshing operation in the DSP 20.

Next, the procedure of one of the failsafe operations, a refresh operation to refresh the resister in an imaging operation, will be described with reference to FIG. 7. FIG. 7 is a flow chart showing an example of the procedure of the register refresh operation in the DSP 20. The register refresh operation is executed based on a program code stored in the ROM 50, and proceeds first to step S200, as shown in FIG. 7. In step S200, when the reception of the synchronizing signal from the sensor drive circuit 21 and the reception of the master clock signal are started at the timer section 29 (Yes), each of the timers starts counting, and the processing proceeds to step S202. On the other hand, when the reception is not started (No), the processing waits until the reception is started.

When the processing proceeds to step S202, the timer controller 29*d* compares a count value from the first timer 29*a* with CT1 set at the operation control register 30. When the count value is CT1 (Yes), the processing proceeds to step S204, and when the count value is not CT1 (No), the processing proceeds to step S212. When the processing proceeds to step S204, the timer controller 29*d* resets the count value of the first timer 29*a* and generates a timer event 1, and transmits the timer event 1 signal to the system controller 23, and the processing proceeds to step S206.

In step S206, the system controller 23 transmits the timer event 1 signal received from the timer section 29 to the sensor controller 26. In response to receiving the timer event 1 signal, the sensor controller 26 reads out the register value (imaging control information) from the mirror register 25, and the processing proceeds to step S208. In step S208, the sensor controller 26 transmits the register value readout and a communication start command to the serial communication IF 27, and the processing proceeds to step S210. In step S210, in response to receiving the communication start command from the sensor controller 26, the serial communication IF 27 transmits the received register value and a register write command through serial communications to the imaging element 10 during blanking periods based on the synchronizing signal from the sensor drive circuit 21, and the processing proceeds to step S212.

By the processing described above, the imaging element 10 receives, through the serial communication IF 14, the imaging control information and the register write command. The serial communication IF 14 rewrites (re-stores) the imaging control information stored in the sensor register 13 in response to the register write command with imaging control information that is the same as that stored in the mirror register 25. It is noted that the register value of the mirror register 25 is fixed at a specified value unless the imaging operation mode is switched, such that the above operation achieves a refresh operation of the sensor register 13. Also, as the operation processing steps from step S202 through step S210 are repeatedly executed, the register value of the sensor register 13 is periodically refreshed at time intervals T1.

On the other hand, in step S202, when the count value of the first timer 29*a* is not CT1, and the processing proceeds to step S212, the timer control section 29*d* compares the count value of the second timer 29*b* with CT2. When the count value is CT2 (Yes), the processing proceeds to step S214. When the count value is not CT2 (No), the processing proceeds to step S202. When the processing proceeds to step S214, the timer control section 29*d* resets the count value of the second timer 29*d* and generates a timer event 2, and transmits the timer event 2 signal to the system controller 23, and the processing proceeds to step S216.

In step S216, the system controller 23 transmits the timer event 2 signal received from the timer section 29 to the ROM-IF 24. In response to receiving the timer event 2 signal, the ROM-IF 24 reads various kinds of data from the ROM 50. More specifically, the ROM-IF 24 reads the register values (operation control information) to be stored in the operation control register 30 and the register values (imaging control information) to be stored in the mirror register 25 from the ROM 50. Then, the ROM-IF 24 transmits the register values readout to the system controller 23, and the processing proceeds to step S218.

In step S218, the system controller 23 rewrites the values stored in the operation control register 30 and the values stored in the mirror register 25 with the register values received from the ROM-IF 24, and the processing proceeds to step S202. It is noted that the operation processing steps from step S212 through S220 are repeatedly executed, such that the register values of each of the registers of the DSP 20 are periodically refreshed at time intervals T2.

Sensor Abnormality Detection and Restoration Operation

Figure 8:
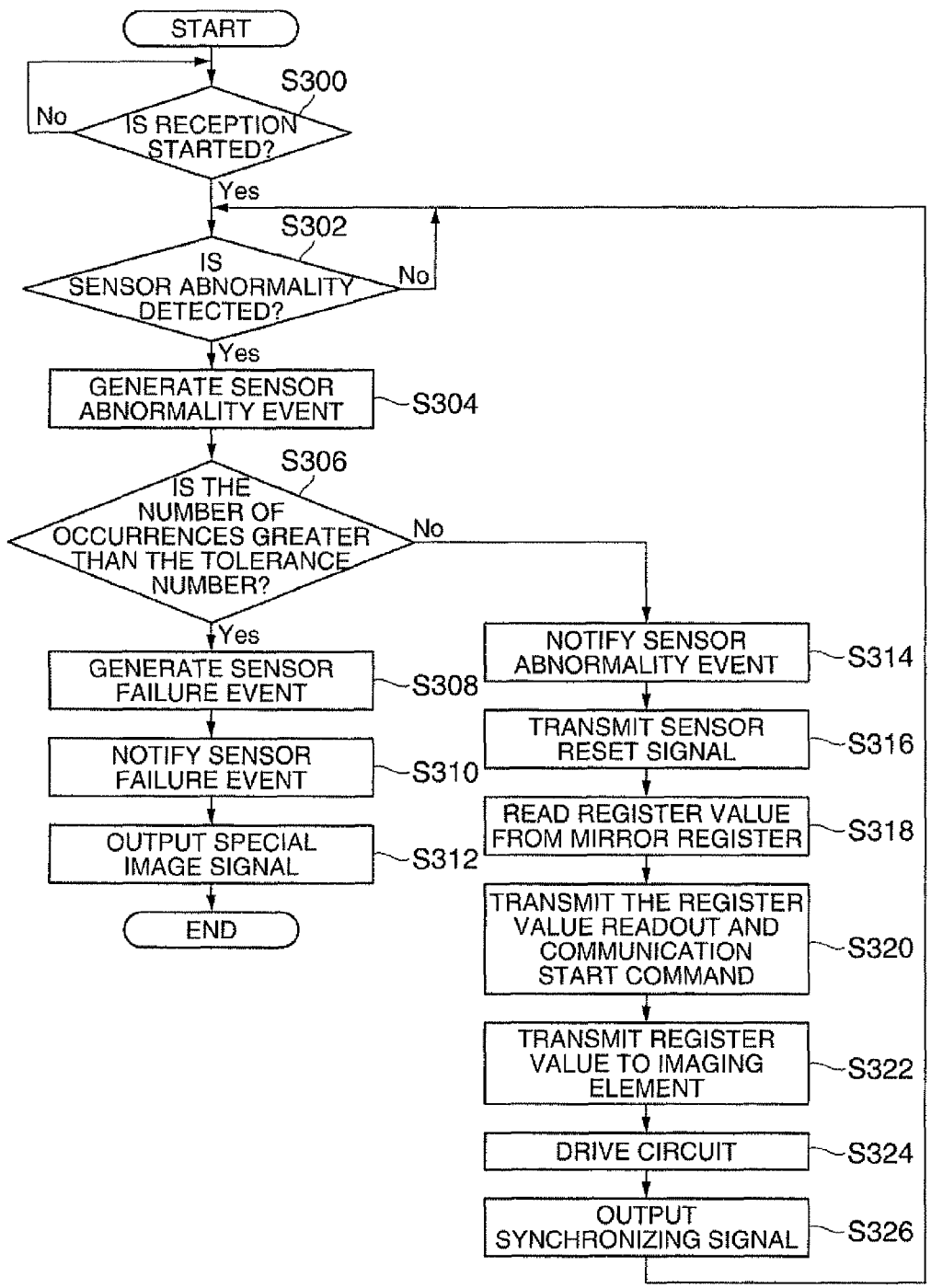
FIG. 8 is a flow chart showing an exemplary procedure of a sensor abnormality detection operation and a restoration operation in the DSP 20.

Next, the processing flow of one of the failsafe operations, an operation to detect abnormality of the imaging element 10 and a restoration operation at the time of the abnormality detection, will be described with reference to FIG. 8. FIG. 8 is a flow chart showing the procedure of the sensor abnormality detection operation and the restoration operation at the DSP 20. The sensor abnormality detection operation and the restoration operation are executed based on a program code stored in the ROM 50, and the processing first proceeds to step S300, as shown in FIG. 8.

In step S300, when the reception of a signal from the sensor drive circuit 21 is started at the sensor abnormality detector 28 (Yes), the processing proceeds to step S302. On the other hand, when the signal reception is not started (No), the processing waits until it is started. When the processing proceeds to step S302, the sensor abnormality detector 28 judges, based on the data enable signal and the captured image data signal received from the sensor drive circuit 21, as to whether or not the received signal has an abnormality. When an abnormality is detected (Yes), the processing proceeds to step S304. When it is not detected (No), the detection process is repeatedly executed until an abnormality is detected.

When the processing proceeds to step S304, the sensor abnormality detector 28 generates a sensor abnormality event, and transmits the sensor abnormality event signal to the system controller 23, and the processing proceeds to step S306. In step S306, the system controller 23 compares the number of occurrences of the sensor abnormality event with a predetermined tolerance number. When the number of occurrences is greater than the tolerance number (Yes), the processing proceeds to step S308. When it does not (No), the processing proceeds to step S314.

When the processing proceeds to step S314, the system controller 23 notifies the sensor controller 26 of the occurrence of the sensor abnormality event, and the processing proceeds to step S316. In step S316, in response to the notification of the sensor abnormality event, the sensor controller 26 transmits a sensor reset signal to the imaging element 10, and the processing proceeds to step S318. By this, at the imaging element 10, in response to the sensor reset signal, the internal sensor register 13 is initialized, and the other digital circuits such as the internal sequencer, the counter and the like are set to a reset state.

In step S318, after the sensor reset signal is released, the sensor controller 26 reads the register values (imaging control information) from the mirror register 25, and the processing proceeds to step S320. In step S320, the sensor controller 26 transmits the register values readout and a communication start command to the serial communication IF 27, and the processing proceeds to step S322. In step S322, in response to the communication start command received from the sensor controller 26, the serial communication IF 27 transmits the received register values and the register write command through serial communications to the imaging element 10, and the processing proceeds to step S324. By this, at the imaging element 10, the same imaging control information stored in the mirror register 25 is written to (stored in) the sensor register 13.

In step S324, after transmitting the imaging control information, the sensor controller 26 transmits a command to the sensor drive circuit 21, thereby driving the sensor drive circuit 21. Further, the system controller 23 transmits a command to the image processing circuit 22, thereby driving the image processing circuit 22, and the processing proceeds to step S326. In step 326, the sensor drive circuit 21 generates a synchronizing signal, and outputs the generated synchronizing signal to the imaging element 10, and the processing proceeds to S302.

On the other hand, in step S306, when the number of occurrences of the sensor abnormality events is greater than the tolerance number, and the processing proceeds to step S308, the system controller 23 generates a sensor failure event, and the processing proceeds to step S310. In step S310, the system controller 23 transmits a sensor failure event signal to the image processing circuit 22, and the processing proceeds to step S312.

In step S312, the image processing circuit 22 stops outputting the display image data generated from the effective image data and, instead, outputs display special image data for displaying a special image on the display device to the host system 100. As the special image signal to be outputted to the host system 100, for example, a display special image data signal for displaying a black solid image may be used. By this, for example, a captured image freeze phenomenon would be prevented from happening. Also, the host system 100 can recognize that an abnormality has occurred in the imaging device upon receiving the display special image data signal.

DSP Abnormality Detection and Restoration Operation

Figure 9:
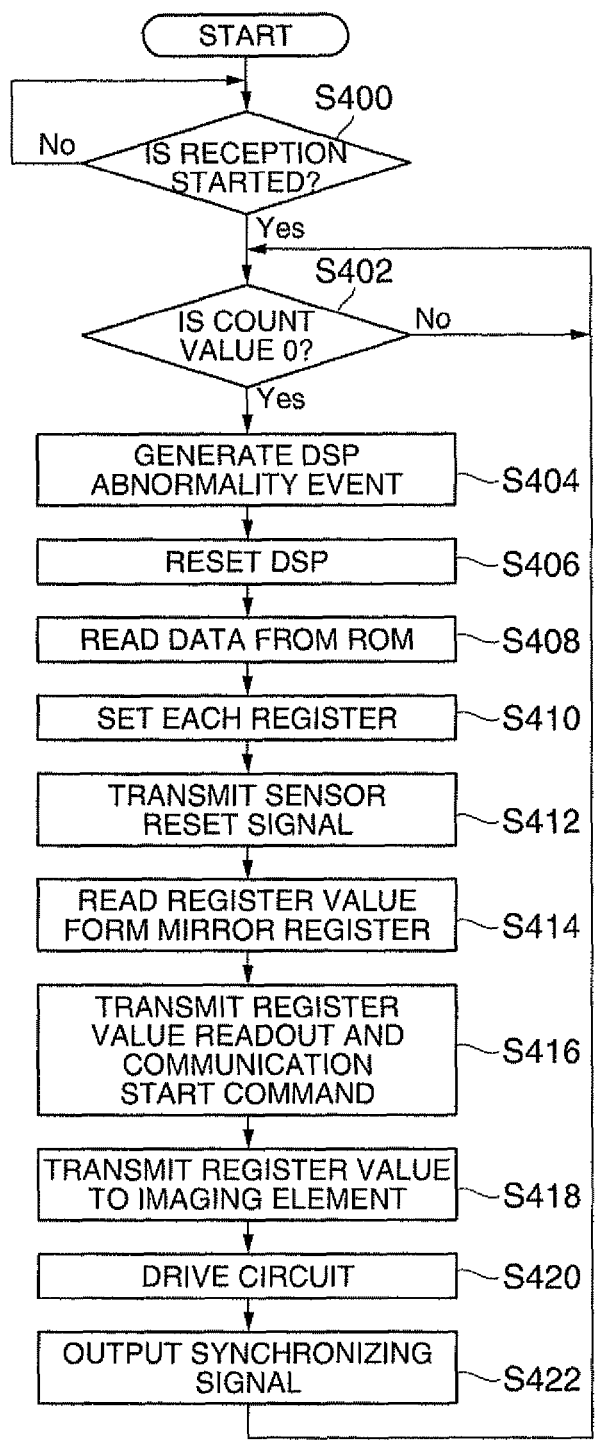
FIG. 9 is a flow chart showing an exemplary procedure of a DSP abnormality detection operation and a restoration operation in the DSP 20.

Next, the processing flow of one of the failsafe operations, an operation to detect abnormality of the DSP 20 and a restoration operation at the time of the abnormality detection, will be described with reference to FIG. 9. FIG. 9 is a flow chart showing the procedure of the DSP abnormality detection operation and the restoration operation at the DSP 20. The DSP abnormality detection operation and the restoration operation are executed based on a program code stored in the ROM 50, and the processing first proceeds to step S400, as shown in FIG. 9.

In step S400, when the reception of the master clock signal is started at the timer section 29 (Yes), the watchdog timer 29c starts a counting operation, and the processing proceeds to step S402. On the other hand, when the reception is not started (No), the processing waits until it starts. When the processing proceeds to step S402, the timer control section 29d receives the count value from the watchdog timer 29c, and judges as to whether or not the count value is "0." When it is judged that the count value is "0" (Yes), the processing proceeds to step S404. When it is not "0" (No), the judgment step is repeatedly executed.

When the processing proceeds to step S404, the timer control section 29d generates a DSP abnormality event, and notifies the system controller 23 of the occurrence of the DSP abnormality event, and the processing proceeds to step S406. In step S406, the system controller 23 resets the entire DSP 20 (to perform a system reset), and notifies the ROM-IF 24 of the occurrence of the DSP abnormality event after the reset, and the processing proceeds to step S408.

In step S408, the ROM-IF 24 reads out operation control information to be stored in the operation control register 30, and imaging control information to be stored in the mirror register 25 from the ROM 50. Then, the ROM-IF 24 transmits the control information readout and a register write command to the system controller 23, and the processing proceeds to step S410. In step S410, the system controller 23 stores the operation control information received from the ROM-IF 24 in the operation control register 30, and stores the imaging control information received from the ROM-IF 24 in the mirror register 25. Further, the system controller 23 transmits a command to the sensor controller 26, and the processing proceeds to step S412.

In step S412, the sensor controller 26 transmits (activates) a sensor reset signal to the imaging element 10, in response to the command from the system controller 23, and the processing proceeds to step S414. By this, in the imaging element 10, in response to the sensor reset signal, the internal sensor register 13 is initialized, and the sequencer and the counter of the internal circuits are also initialized. In step S414, the sensor controller 26 reads the imaging control information from the mirror register 25 after releasing the sensor reset signal, and then the processing proceeds to step S416.

In step S416, the sensor controller 26 transmits the imaging control information readout and a communication start command to the serial communication IF 27, and the processing proceeds to S418. In step S418, in response to the communication start command received from the sensor controller 26, the serial communication IF 27 transmits the received register value and a register write command through serial communications to the imaging element 10, and the processing proceeds to step S420. By this, in the imaging element 10, the same imaging control information stored in the mirror register 25 is written to (stored in) the sensor register 13.

In step S420, after transmission of the imaging control information, the sensor controller 26 transmits a command to the sensor drive circuit 21, thereby driving the sensor drive circuit 21. Further, the system controller 23 transmits a command to the image processing circuit 22, thereby driving the image processing circuit 22, and the processing proceeds to step S422. In step S422, the sensor drive circuit 21 generates a synchronizing signal, and outputs the generated synchronizing signal to the imaging element 10, and then the processing proceeds to step S402.

Exemplary Operation of Imaging Device of Embodiment

Figure 10A:
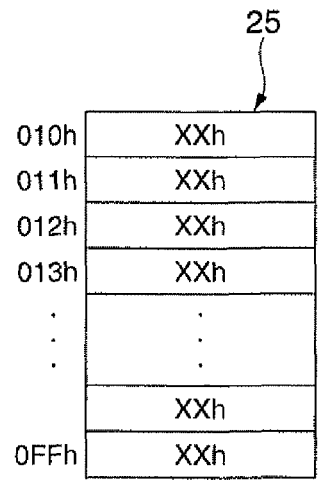
FIG. 10A shows an example of a mirror register 25.
Figure 10B:
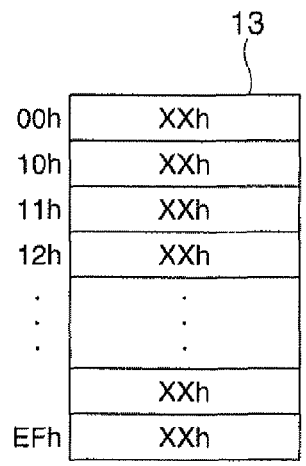
FIG. 10B shows an example of a sensor register 13.
Figure 10C:
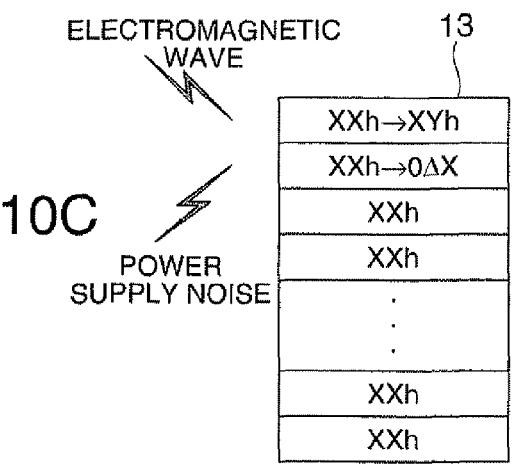
FIG. 10C shows an example in which data stored in the sensor register 13 in a damaged state.
Figure 11A:
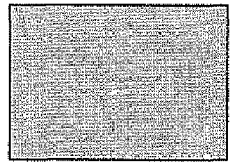
FIGS. 11A and 11B show examples of special images displayed at the time of detection of failure of the imaging element 10.
Figure 11B:
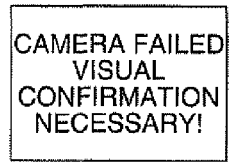
Figure 11C:
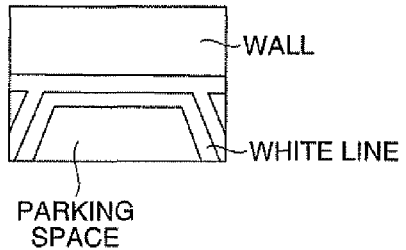
FIG. 11C shows an example of a displayed image of a captured image.
Figure 12:
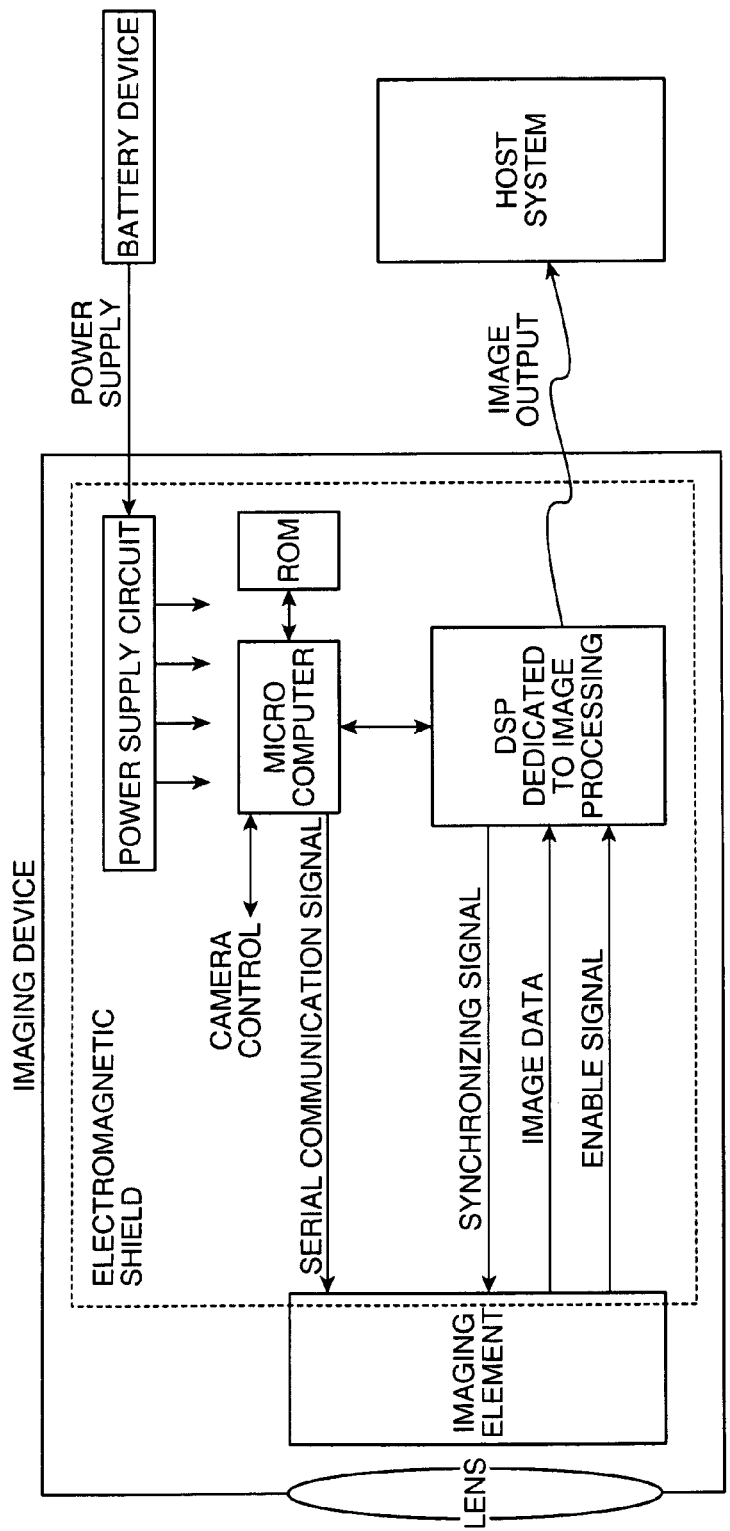
FIG. 12 is a schematic block diagram of the configuration of an imaging device 1 of related art.

Next, referring to FIGS. 10A-10C and FIGS. 11A-11C, more specific operations of the imaging device 1 in accordance with the embodiment will be described. FIG. 10A shows an example of the mirror register 25, FIG. 10B shown an example of the sensor register 13, and FIG. 10C shows an exemplary state in which stored data of the sensor register 13 is damaged by external noise or the like. Further, FIGS. 11A and 11B are diagrams showing examples of special images to be displayed at the time of failure detection of the imaging element 10, and FIG. 11C is a diagram showing an example of a displayed image of a captured image.

In an example described below, the imaging device 1 in accordance with the present embodiment is mounted on a car, and is used for capturing a display image to be displayed on a car-mounted rear view monitor. First, when the car engine is started, and the power is supplied from the battery device 200 to each electrical wiring system, the host system 100 starts up (including recovery from a sleep mode), the power is supplied to the power supply circuit 51 of the imaging device 1, and each of the components of the imaging device 1 including the imaging element 10, the DSP 20 and the ROM 40 starts up. After starting up, the host system 100 first sets the system reset signal to be supplied to the DSP 20 to an active state, thereby rendering the DSP 20 to perform the reset operation. Then, after completing the reset operation, the system reset signal is switched to a non-active state (released).

By this, the DSP 20 detects the releasing of the reset ("Yes" in step S100), and performs the imaging start operation according to the program code stored in the ROM 50. First, the ROM-IF 24 reads operation control information from the ROM 50, and transmits the operation control information readout and a register write command to the system controller 23. By this, the system controller 23 stores the operation control information received from the ROM-IF 24 in the operation control register 30 (step S102).

Next, the ROM-IF 24 reads out imaging control information corresponding to an operation mode set by the user through the host system 100 or the like from the ROM 50, and transmits, to the system controller 23, the imaging control information readout and a register write command. By this, the system controller 23 stores the imaging control information received from the ROM-IF 24 in the mirror register 25 (step S104). By the forgoing operation, the imaging control information "XXh" are stored at the register addresses "010h-0FFh" of the mirror register 25, as shown in FIG. 10A.

Next, the ROM-IF 24 stores the imaging start command "55h" readout from the ROM 50 in a command register corresponding to the register address "00h" (step S106). By this, the system controller 23 receives the imaging start command from the command register, and transmits the same to the sensor controller 26. Upon receiving the imaging start command, the sensor controller 26 first makes effective (activates) the sensor reset signal, and initializes each of the digital circuits composing the imaging element 10 (step S108).

After initializing each of the digital circuits, the sensor controller 26 releases the sensor reset signal (to non-active), reads out the imaging control information from the mirror register 25, and transmits the imaging control information with a communication start command to the serial communication IF 27. In response, the serial communication IF 27 parallel-to-serial converts the imaging control information and the communication start command, and transmits them through serial communications to the imaging element 10 (step S112).

At the imaging element 10, in response to the register write command received from the DSP 20, the serial communication IF 14 stores the imaging control information received in the sensor register 13. By this, as shown in FIG. 10B, the imaging control information "XXh" are stored at the register addresses "00h-Efh" of the sensor register 13. In other words, the same imaging control information stored in the mirror register 25 is stored in the sensor register 13. Then, the drive mode of the sensor section 11 is set by the imaging control information stored in the sensor register 13.

On the other hand, after transmitting the imaging control information, at the DSP 20, the sensor controller 26 transmits a command to the sensor drive circuit 21, thereby driving the sensor drive circuit 21. Further, the system controller 23 transmits a command to the image processing circuit 22, thereby driving the image processing circuit 22 (step S112). By this, the sensor drive circuit 21 drives, generates a synchronizing signal, and outputs the generated synchronizing signal to the imaging element 10 (step S114). In this manner, when the synchronizing signal is transmitted to the imaging element 10, the imaging element 10 starts an imaging operation in an operation mode according to the imaging control information stored in the sensor register 13, whereby captured image data and a data enable signal are outputted through the readout circuit 15 to the DSP 20.

On the other hand, when the imaging operation is started, and the synchronizing signal is supplied to the timer section 29, the first timer 29a and the second timer 29b starts the count operation ("Yes" at step S200). Count values are inputted in the timer control section 29d, and the timer control section 29d compares the count value CV1 of the first timer 29a with a pre-set count value CT1. Also, the timer control section 29d compares the count value CV2 with a pre-set count value CT2.

Then, when it is judged that the CV1 becomes equal to CT1 ("Yes" in step S200), the timer control section 29d resets the first timer 29a, generates a timer event 1, and transmits a timer event 1 signal to the system controller 23 (step S204). The system controller 23 notifies the sensor controller 26 of the occurrence of the timer event 1. The sensor controller 26 reads the imaging control information from the mirror register 25 (step S206), and transmits the imaging control information together with a communication start command to the serial communication IF 27 (step S208).

The serial communication IF 27 parallel-to-serial converts the imaging control information and the register write command in response to the communication start command, and transmits them through serial communications to the imaging element 10 (step S210). At this time, the serial communication IF 27 performs serial communications based on the synchronizing signal from the sensor drive circuit 21, in synchronism with blanking periods that are output periods in which invalid data of the captured image data signal is outputted. By this, at the imaging element 10, the same imaging control information stored in the mirror register 25 is rewritten to (restored in) the sensor register 13. In other words, a refreshing operation of the sensor register 13 (hereafter referred to as a refreshing operation R1) is performed. The refreshing operation R1 is repeated with the period of a time interval T1.

Even in poor surroundings where electromagnetic waves fly past one another, the imaging element 10 cannot be covered by the electromagnetic shield 60 as it should perform sensing operations. Therefore, due to the influence of external noise such as thunderbolt, static electricity, electromagnetic waves and the like and fluctuations in the power supply due to battery driving, the register values at the sensor register 13 may change to different values or may be damaged into incomprehensive contents, as shown in FIG. 10C. In such a case, by preforming the refreshing operation, the imaging operation can be restored in the middle of the imaging operation.

On the other hand, when it is judged that CV2 becomes equal to CT2 ("Yes" in step S212), the timer control section 29d resets the second timer 29b, generates a timer event 2, and transmits a timer event 2 signal to the system controller 23. Then, upon receiving the timer event 2 signal, the system controller 23 notifies the ROM-IF 24 of the occurrence of the timer event 2 (step S214). In response to receiving the notification of the occurrence of the timer event 2, the ROM-IF 24 reads out the operation control information and the imaging control information from the ROM 50 (step S216). Then, the ROM-IF 24 transmits the operation control information and the imaging control information readout to the system controller 23 (step S218).

By this, the system controller 23 rewrites the operation control information stored in the operation control register 30 with the operation control information received from the ROM-IF 24. Further, the system controller 23 rewrites the imaging control information stored in the mirror register 25 with the imaging control information received from the ROM-IF 24 (step S220). In other words, a refreshing operation for the operation control register 30 and the mirror register 25 (hereafter referred to as a refreshing operation R2) is preformed. This refreshing operation R2 is repeated with the period of a time interval T2. It is noted that, as the ROM 50 is a nonvolatile memory and is covered by the electromagnetic shield 60, the possibility of its stored data being destroyed is extremely low. Therefore, the set values of the operation control register 30 and the mirror register 25 can be periodically refreshed to reliable set values.

Like in the case of the sensor register 13, there is a possibility that the register values of the operation control register 30 and the mirror register 25 may change to different values or may be damaged into incomprehensive contents, due to power supply noise or the like generated in the battery device 200. In such a case, by performing the refresh operation R2, the imaging operation can be restored in the middle of the imaging operation.

Further, when the reception of the signal from the sensor drive circuit 21 starts ("Yes" in step S300), the sensor abnormality detector 28 starts an abnormal detection operation. The sensor abnormality detector 28 first judges, based on the data enable signal and the captured image data signal received from the sensor drive circuit 21, as to whether or not an abnormality is present in the received signal. In this example, it is judged that the signal contains an abnormality (i.e., the imaging element 10 has abnormality), when the data enable signal remains invalid for a period for five frames or more (step S302). Upon detecting the abnormality, the sensor abnormality detector 28 generates a sensor abnormality event, and transmits a sensor abnormality event signal to the system controller 23 (step S304). Upon receiving the sensor abnormality event signal, the system controller 23 compares the number of occurrences of the sensor abnormality event with a pre-set tolerance number.

When the number of occurrences is less than the tolerance number ("No" in step S306), the system controller 23 notifies the sensor controller 26 of the occurrence of the sensor abnormality event (step S314). In response to the notification of the sensor abnormality event, the sensor controller 26 transmits (activates) a sensor reset signal to the imaging element 10 (step S316), thereby resetting each of the digital circuits of the imaging element 10. Thereafter, the sensor controller 26 releases the sensor reset signal, and reads out imaging control information from the mirror register 25 (step S318). The sensor controller 26 transmits the imaging control information readout and a communication start command to the serial communication IF 27 (step S320).

In response to the communication start command received from the sensor controller 26, the serial communication IF 27 transmits the register values received and a register write command through serial communications to the imaging element 10 (step S322). By this, at the imaging element 10, the same imaging control information stored in the mirror register 25 is written to (stored in) the sensor register 13.

After transmitting the imaging control information, the sensor controller 16 transmits a command to the sensor drive circuit 21, thereby driving the sensor drive circuit 21. Further, the system controller 23 transmits a command to the image processing circuit 22, thereby driving the image processing circuit 22 (step S324). By this, the sensor drive circuit 21 generates a synchronizing signal, and outputs the generated synchronizing signal to the imaging element 10 (step S326). The sensor abnormality event occurs in parallel with the timer event 1 and the timer event 2, and therefore the imaging element 10 can be restored, even when a problem that cannot be avoided only by the refresh operations R1 and R2 occurs.

On the other hand, when the number of occurrences of the sensor abnormality event is greater than the tolerance number ("Yes" in step S306), the system controller 23 generates a sensor failure event (step S308). The tolerance number may be set to three times when the sensor abnormality events continuously occur, and may be set to ten times when they do not continuously occur.

Then, the system controller 23 notifies the image processing circuit 22 of the occurrence of the sensor failure event (step S310). By this, the image processing circuit 22 stops outputting the display image data generated from the effective image data to the host system 100 and, instead, outputs display special image data for displaying a special image to the host system 100 (step S312).

For example, as shown in FIG. 11C, let us assume that, while the user is trying to park his car in a parking space while watching the image displayed on the rear-view monitor, the imaging element 10 fails and remains in a state in which the same image continues being displayed. In this case, if the user continues his attempt to park his car while only watching the rear-view monitor, an accident may occur in which the car may hit the wall or the like. Under such circumstances, the imaging device 1 in accordance with an aspect of the embodiment may display, for example, a black solid image shown in FIG. 11A, or a message containing image shown in FIG. 11B on the rear-view monitor as the display special image. As a result, the user can quickly step on the brake pedal, or can visually confirm the current situation.

Also, when the master clock signal is supplied to the timer section 29, the watchdog timer 29c starts a down-counting operation ("Yes" in step S400). The down-count value is inputted in the timer section 29. On the other hand, the system controller 23 is configured to reset the watchdog timer 29c before the pre-set count value CW becomes to be "0."

The timer control section 29d, as it judges that the down-count value of the watchdog timer 29c has become to be "0" ("Yes" in step S402), generates a DSP abnormal event, and notifies the system controller 23 of the occurrence of the DSP abnormality event (step S404). The system controller 23 resets the entire DSP 20 (step S406) and, after the reset, notifies the ROM-IF 24 of the occurrence of the DSP abnormality event.

Upon receiving the notification of the DSP abnormality event, the ROM-IF 24 reads, from the ROM 50, operation control information to be stored in the operation control register 30 and imaging control information to be stored in the mirror register 25 (step S408). Then the ROM-IF 24 transmits the control information readout and a register write command to the system controller 23. In response, the system controller 23 stores the operation control information received from the ROM-IF 24 in the operation control register 30, and the imaging control information received from the ROM-IF 24 in the mirror register 25 (step S410). Furthermore, the system controller 23 transmits a command to the sensor controller 26.

In response to the command from the system controller 23, the sensor controller 26 activates the sensor reset signal with respect to the imaging element 10 (step S412). By this, in response to the sensor reset signal, in the imaging element 10, the internal sensor register 13 is initialized, and the sequencer and the counter of the internal circuit are also initialized. After releasing the sensor reset signal, the sensor controller 26 reads the imaging control information from the mirror register 25 (step S414), and transmits the imaging control information readout and a communication start command to the serial communication IF 27 (step S416).

In response to the communication start command received from the sensor controller 26, the serial communication IF 27 transmits the register values received and a register write command through serial communications to the imaging element 10 (step S418). As a result, in the imaging element 10, the same imaging control information stored in the mirror register 25 is written to (stored in) the sensor register 13. After transmitting the imaging control information, the sensor controller 26 transmits a command to the sensor drive circuit 21, thereby driving the sensor drive circuit 21. Further, the system controller 23 transmits a command to the image processing circuit 22, thereby driving the image processing circuit 22 (step S420). By this, the sensor drive circuit 21 generates a synchronizing signal, and outputs the generated synchronizing signal to the imaging element 10 (step S422).

In other words, when an abnormality occurs in the DSP 20 itself, the DSP 20 is forcefully resets itself, and the operation of the DSP 20 and the operation of the imaging element 10 are restored to the normal state. In this manner, the imaging device 1 in accordance with the present embodiment can periodically refresh the imaging control information stored in the sensor register 13 of the imaging element 10 with the period of a time interval T1. In this case, the transmission of the imaging control information from the DSP 20 can be performed during blanking periods of the captured image data signal outputted from the imaging element 10, based on the synchronizing signal provided from the sensor drive circuit 21. Therefore, even when the imaging element 10 goes into an abnormal state due to external noise, and the register values at the sensor register 13 change, the register values are periodically rewritten by the refresh function described above, and they can be automatically restored.

Also, as the data transmission is performed during blanking periods in which most of the IOs of the imaging element are in a stationary state, the power supply would not fluctuate, and therefore deterioration of signal S/N can be suppressed. Furthermore, the imaging control information stored in the mirror register 25 of the DSP 20 can be periodically refreshed with the period of a time interval T2. By this, the DSP 20 reads data stored in the ROM 50 that is a nonvolatile memory, and periodically refreshes each of the registers. Therefore, even if any of the register values of the registers of the DSP 20 are changed due to external noise, they can be automatically restored.

Further, based on the data enable signal and the captured image data signal outputted from the imaging element 10, the occurrence of an abnormality in the imaging element 10 can be detected, and each of the digital circuits of the imaging element 10 can be initialized and the imaging control information stored in the sensor register 13 can be refreshed upon detection of such an abnormality. By this, the imaging element 10 can be automatically restored, and each of the digital circuits composing the imaging element 10 is initialized. Therefore, even when problems that cannot be avoided only by refreshing the sensor register 13 occur, such problems can be accommodated.

Moreover, when the number of occurrences of abnormality in the imaging element 10 becomes greater than the tolerance number, the imaging element 10 judges that it has a failure, and can output display special image data to the host system 100, instead of normal display image data. As a result, it is possible to prevent wrong images from being displayed on the display device including prevention of continuous display of the same captured image. Therefore it is possible to prevent accidents from happening, for example, when the user of a vehicle-mount monitor drives a vehicle while watching images on the monitor.

By displaying a special image (or transmitting special image data), the user and the host system 100 can be notified that the imaging element 1 has a failure. Further, the timer section 29 can detect the occurrence of a failure in the DSP 20, and the DSP 20 can automatically, forcefully reset itself. By this, even when an abnormality occurs in the DSP 20 itself, the DSP 20 can be automatically restored.

Components of the imaging device 1 other than the components relating to sensing operations including the imaging element 10 and the imaging lens 70 are covered by the electromagnetic shield 60. By this, influence of external noise can be reduced for the components other than the components relating to sensing operations by the imaging device 1. More specifically, it is possible to reduce destruction of the original data stored in the mirror register 25 and the ROM 50 by external noise at the time of refreshing. In the embodiment described above, the DSP 20 may correspond to an imaging control circuit, the sensor section 11, the drive circuit 12 and the readout circuit 15 may correspond to an imaging device, and the sensor register 13 may correspond to a first register.

Also, in the embodiment described above, the serial communication IF 14 may correspond to an imaging control information reception device and a first imaging control information storage device, and the electromagnetic shield 60 may correspond to an electromagnetic shield device. Also, in the embodiment described above, the mirror register 25 may correspond to a second register, the serial communication IF 27 may correspond to an imaging control information transmission device, and the operation control register 30 may correspond to a third register. Further, in the embodiment described above, the system controller 23 may correspond to a second imaging control information storage device, a first imaging control information update device, a second imaging control information update device, an operation control information update device and an initialization device. The ROM 50 may correspond to a nonvolatile memory.

Also, in the embodiment described above, the first timer 29a and the timer control section 29d may correspond to a first time period detection device, and the second timer 29b and the timer control section 29d may correspond to a second time period detection device. Also, in the embodiment described above, the sensor abnormality detector 28 may correspond to an element abnormality detection device, and the watchdog timer 29c and the timer control section 29d may correspond to a circuit abnormality detection device.

Also, in the embodiment described above, the sensor controller 26 may correspond to a first initialization signal transmission device and a second initialization signal transmission device. It is noted that the embodiment described above is described as being configured to transmit imaging control information from the DSP 20 to the imaging element 10 through serial communications. However, other configurations such as a configuration to perform parallel communications may be used without any particular limitation to the above.

Also, the embodiment described above is configured to detect an abnormality in the imaging element 10 based on a data enable signal and a captured image data signal. However, without any limitation to the above, it is possible to use other configurations, such as, a configuration in which a device for detecting abnormality is provided on the imaging element 10, and a configuration to detect abnormality based on other types of output signals. Further, in the embodiment described above, an example in which the sensor section 11 is configured with CMOS type sensor cells is described. However, without being limited to the above, other configurations, such as, a configuration with CCDs may be used as long as imaging operations such as switching of operation modes, and the like are controlled by the sensor register 13.

The embodiments described above are preferred exemplary embodiments of the invention with various kinds of technically preferable limitations. However, the scope of the invention is not intended to be limited to the embodiments described above, unless stated otherwise to particularly limit the invention in the above description. Also, for the convenience of illustration, the drawings used in the above description are schematic diagrams in which the horizontal and vertical dimensions of members or parts are not to scale. Also, the invention is not intended to be limited to the above embodiments, but any variation and improvement within the range that achieve the objects of the invention are included in the scope of the invention.

What is claimed is:

1. An imaging device comprising:
   an imaging element that is capable of imaging an imaging object; and
   an imaging control circuit that controls an imaging operation of the imaging element,
   the imaging element including
     a first register,
     an imaging control information reception device that receives imaging control information for controlling the imaging operation of the imaging element,
     a first imaging control information storage device that stores the imaging control information received by the imaging control information reception device in the first register, and
     an image operation device that performs an imaging operation based on the imaging control information stored in the first register;
   the imaging control circuit including
     a second register,
     a second imaging control information storage device that stores, in the second register, imaging control information that is identical with the imaging control information stored in the first register,
     an imaging control information transmission device that transmits the imaging control information stored in the second register to the imaging element, and
     a first imaging control information update device that transmits the imaging control information stored in the second register by the imaging control information transmission device to the imaging element upon establishment of a first predetermined condition during an imaging operation of the imaging element, and rewrites the imaging control information stored in the first register with the imaging control information transmitted,
   the imaging device further comprising a nonvolatile memory that stores the imaging control information, the imaging control circuit having a second imaging control information update device that performs, in response to establishment of a second predetermined condition, a first update processing of reading, from the nonvolatile memory, imaging control information identical with the imaging control information stored in the first register, and rewriting the imaging control information stored in the second register with the imaging control information readout,
   wherein the nonvolatile memory stores, in addition to the imaging control information, operation control information for controlling the operation of each component of the imaging control circuit; the imaging control circuit includes a third register that stores the operation control information, an operation control information storage device that reads the operation control information from the nonvolatile memory and stores the operation control information readout in the third register, and an operation control information update device that performs, during an imaging operation of the imaging element, in response to establishment of the second predetermined condition, a second update processing of reading out the operation control information from the nonvolatile memory, and rewriting the operation control information stored in the third register with the operation control information readout; and the second imaging control information update device performs the first update processing after completion of the second update processing.

2. An imaging device according to claim 1, wherein the first predetermined condition is an indication that the imaging control information stored in the first register is not identical to the imaging control information stored in the second register.

3. An imaging device according to claim 1, wherein the imaging control circuit includes a first time period detection device that periodically detects the passage of a first predetermined time, and the first predetermined condition is established each time the first time period detection device detects the passage of the first predetermined time.

4. An imaging device according to claim 3, wherein the imaging element outputs captured image data obtained through imaging an imaging object by the imaging operation as a captured image signal including an effective data output period and an invalid data output period, the first imaging control information update device transmits, in response to establishment of the first predetermined condition, the imaging control information stored in the second register by the imaging control information transmission device to the imaging element during the invalid data output period of the captured image signal that is outputted by the imaging element.

5. An imaging device according to claim 1, wherein the imaging control circuit includes an element abnormality detection device that detects occurrence of an abnormality in the imaging element based on a signal outputted from the imaging element, and the first predetermined condition is established in response to detection of an abnormality by the element abnormality detection device.

6. An imaging device according to claim 5, wherein the imaging control circuit includes a first initialization signal transmission device that transmits, in response to detection of an abnormality by the element abnormality detection device, an initialization signal for initializing each digital circuit composing the imaging element, and the first imaging control information update device transmits, after the initialization, the imaging control information stored in the second register by the imaging control information transmission device to the imaging element.

7. An imaging device according to claim 1, wherein the first imaging control information update device transmits, after completion of the first update processing, the imaging control information rewritten to the imaging element, using the imaging control information transmission device.

8. An imaging device according to claim 1, wherein the imaging control circuit includes a second time period detection device that periodically detects the passage of a second predetermined time, and the second predetermined condition is established each time the second time period detection device detects the passage of the second predetermined time.

9. An imaging device according to claim 1, wherein the imaging control circuit includes a circuit abnormality detection device that detects occurrence of an abnormality in the imaging control circuit, and the second predetermined condition is established in response to detection of an abnormality by the circuit abnormality detection device.

10. An imaging device according to claim 9, wherein the imaging control circuit includes an initialization device that initializes each component composing the imaging control circuit including the second register and a third register in response to detection of an abnormality in the imaging control circuit by the circuit abnormality detection device, and the operation control information update device performs a second update processing after the initialization by the initialization device, the second update processing comprising reading out operation control information from the nonvolatile memory, and rewriting operation control information stored in the third register with the operation control information readout.

11. An imaging device according to claim 1, wherein the imaging control circuit includes a second initialization signal transmission device that transmits an initialization signal for initializing each component of the imaging device to the imaging element, after completion of the first update processing and the second update processing, and the first imaging control information update device transmits, after the imaging element has been initialized by the initialization signal, the rewritten imaging control information stored in the second register by the imaging control information transmission device to the imaging element.

12. An imaging device according to claim 1, further comprising an electromagnetic shield device that shields the imaging control circuit from external electromagnetic interference.

* * * * *